United States Patent [19]

Günthner

[11] Patent Number: 4,619,682

[45] Date of Patent: Oct. 28, 1986

[54] METHOD FOR OPERATOR-CONTROLLED MOLTEN GLASS LUMP PROCESSING

[75] Inventor: Franz Günthner, Mainz-Lerchenberg, Fed. Rep. of Germany

[73] Assignee: Schott Glaswerke, Fed. Rep. of Germany

[21] Appl. No.: 736,235

[22] Filed: May 21, 1985

[30] Foreign Application Priority Data

May 25, 1984 [DE] Fed. Rep. of Germany ....... 3419608

[51] Int. Cl.$^4$ ............................................... C03B 9/03
[52] U.S. Cl. ......................................... 65/64; 65/76; 65/77; 65/228
[58] Field of Search ................... 65/64, 68, 76, 77, 73, 65/228, 268

[56] References Cited

U.S. PATENT DOCUMENTS 1,401,713 12/1921 Lecoultre ............................... 65/228

FOREIGN PATENT DOCUMENTS 265542 10/1913 Fed. Rep. of Germany ......... 65/28
2161885 7/1973 Fed. Rep. of Germany .
AS2414190 11/1976 Fed. Rep. of Germany .
3122400 11/1982 Fed. Rep. of Germany .

*Primary Examiner*—Arthur Kellogg
*Attorney, Agent, or Firm*—Hill, Van Santen, Steadman & Simpson

[57] ABSTRACT

In a method for the mechanized processing of vacuum molded glass lumps, particularly of heavy glass lumps which could hitherto be further processed only with a large outlay in personnel, the preliminary blowing and the transport of the glass lump to the marver, to the heating oven and to the fashioning station, the final blow-out and the transport to the lehr are all carried out by means of a manipulator. This manipulator has a turntable mounted on a driveable undercarriage, a blowing iron arranged in a holder device, a unit for rotating the iron about its longitudinal axis, an arm for pivoting the blowing iron about an axis at right angles to its longitudinal axis, an air supply system for inflating the glass lump, a two-part marver for supporting the glass lump and operating elements for controlling the drives.

3 Claims, 5 Drawing Figures

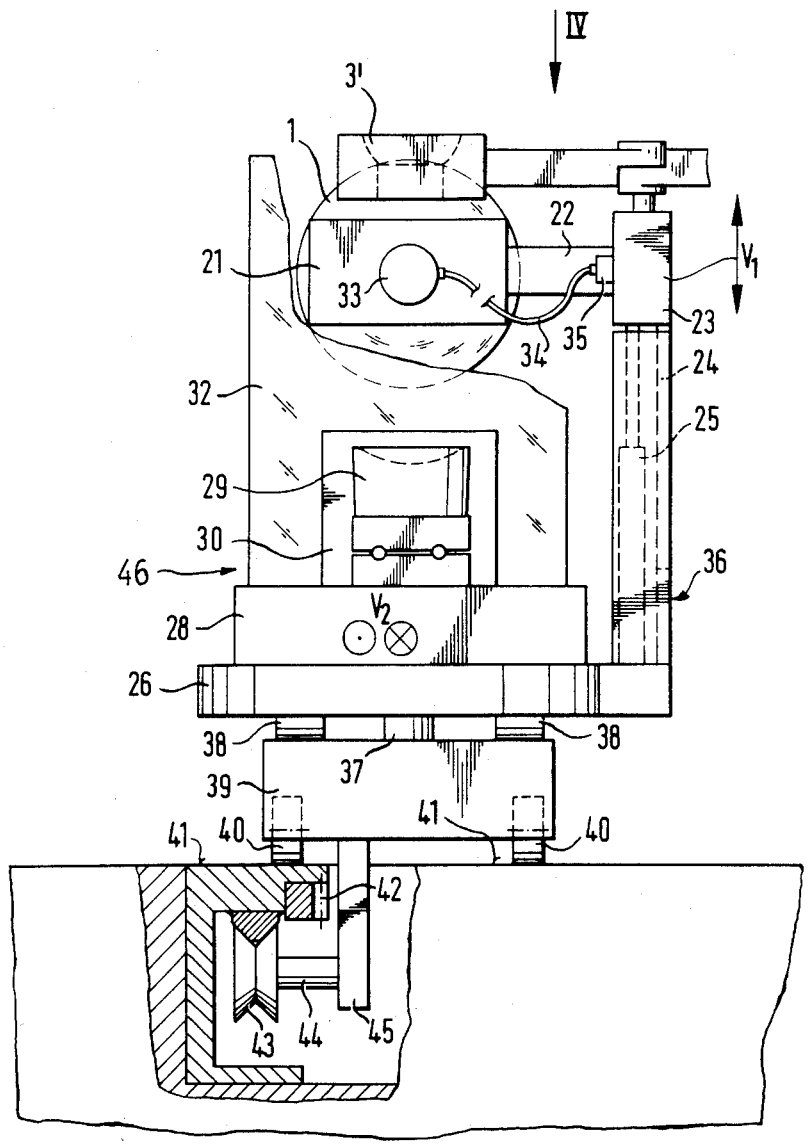

METHOD FOR OPERATOR-CONTROLLED MOLTEN GLASS LUMP PROCESSING

BACKGROUND

1. Field of the Invention

The invention relates to a method and apparatus for mechanised processing of vacuum-molded glass batches or lumps.

2. Description of the Prior Art

Glass lumps are taken from the melt by means of a one- or multi-part suction mold in accordance with the method described in German No. PS 21 61 885. Then, normally, the whole glass lump or batch is transferred to a blowing iron or lance. Further processing of the glass lump such as preliminary blowing, marving or final blowing in the mold takes place manually. To this end, the glass lump, which sticks to the blowing iron, must be transported between several work stations and must be safely controlled by the glassmaker at all times. With smaller glass lumps, this type of further processing work can only just be managed by a single glassmaker.

With glass lumps of greater weight however, approximately a lump formed by vacuum molding is no longer manually treatable because it is too unstable due to its high heat content and cannot be adequately controlled by a single glassmaker. Nor can such vacuum molded glass lumps be properly managed with conventional aids such as hooks and lifting tackle successfully applied to glass lumps formed in the conventional way, such as by multiple (up to 7 times) overtapping, because the required processing conditions cannot be realised with such aids.

Compared with the conventional method of forming glass lumps, by multiple overtapping, i.e. covering or coating of a slightly cooled, solidified hollow glass sphere sticking to the blowing iron with a new layer of viscous glass, the vacuum holding method has considerable advantages as described in German No. PS 21 61 885. The conventional method is very heavy work and can be carried out only by physically very strong glassmakers of which, moreover, a large number (6 to 8 persons per work station) must be provided.

SUMMARY OF THE INVENTION

It is an object of the present invention therefore to provide a method and apparatus enable heavy vacuum molded glass lumps to be further processed irrespectively of the physical strength of the glassmaker and with fewer operators, while maintaining the required processing conditions.

In preparation for further processing according to the method disclosed herein, the batch or lump of glass in the vacuum mold is pre-pressed in such a way as to create a hollow space with the outwardly displaced quantity of glass forming a ring. During this operation enough heat is extracted on the inside by the tool forming the hollow space, and on the outside by the vacuum mold against which the glass is applied by pressure, to render the lump sufficiently stable, or viscous, for the subsequent transport and processing stages, and to prevent the hollow space which remains inside after the subsequent attachment of the blowing iron from collapsing due to re-heating. The degree of cooling is controlled through pressing time and cooling of the tools which consist of the suction mold and the die with the gauge. After withdrawl of the gauge, a blowing iron provided with a plate-shaped head is pressed onto the glass ring on the lump. The head of the iron is sufficiently preheated to stick or bond to the glass surface of the ring thereby forming a dynamic and airtight joint. The preforming mold is then opened and the lump is processed further by mechanical means, i.e. machinery.

The further processing operations such as preliminary blowing, transporting the lump to the marver, to the heading oven and to the forming station, final blowing out and transporting to the cooling lehr are all applied with the aid of the manipulator disclosed herein which, while allowing the glassmaker personally to supervise and control all stages, does not make heavy demands on his physical strength. The forces needed at the different work stations are provided by the apparatus. Instead of from 6 to 8 people, only two glassmakers are now needed and these will achieve at least the same output performance in processed glass lumps, with substantially improved quality.

DESCRIPTION OF THE DRAWINGS

The apparatus according to the invention is hereinafter more particularly described with reference to an embodiment illustrated by way of example in the drawings in which:

FIG. 5 is a side view of the manipulator according to the invention.

DESCRIPTION OF THE PREFERRED EMBODIMENTS

Figure 1:
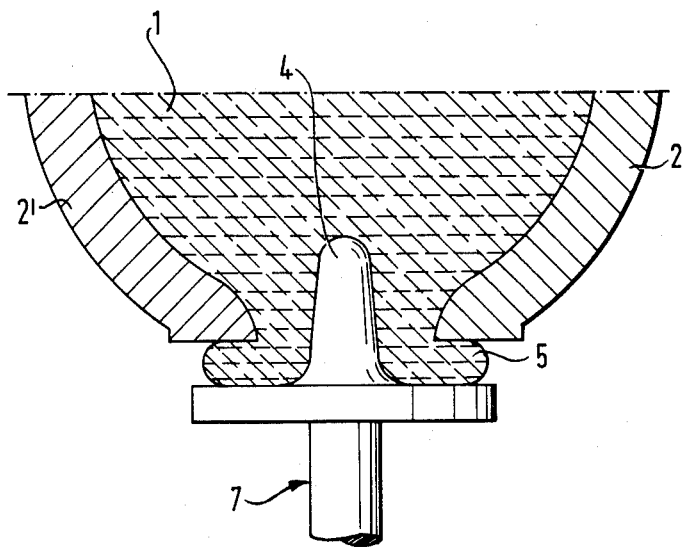
FIG. 1 is a section through a known two-part suction mold with a preformed glass lump.

FIG. 1 shows a two-part vacuum mold comprised of separable halves 2 and 2' in the operative pressing position with molten glass 1 therein. The gauge 4 of the die 7 is in the upper end position; the glass ring 5 is already formed.

Figure 2:
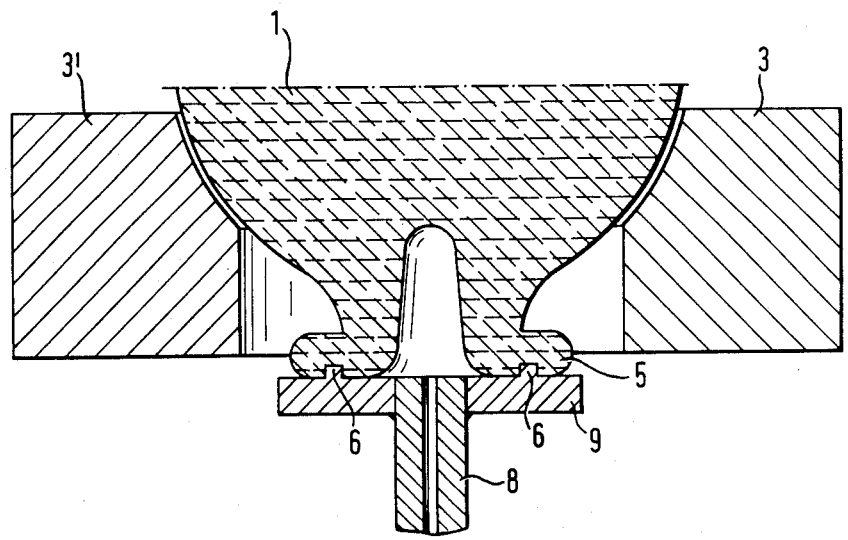
FIG. 2 is a section through the glass lump, supporting marver and blowing iron.

In FIG. 2 the pre-heated blower head 9 of the blowing iron 8 is joined to the ring of the glass lump 1, the glass sticking firmly to the metal at mutually contacting surfaces. The blowing iron head 9 is provided with a ring of metal cams 6 to enhance still further the bond between it and the glass lump.

Figure 3:
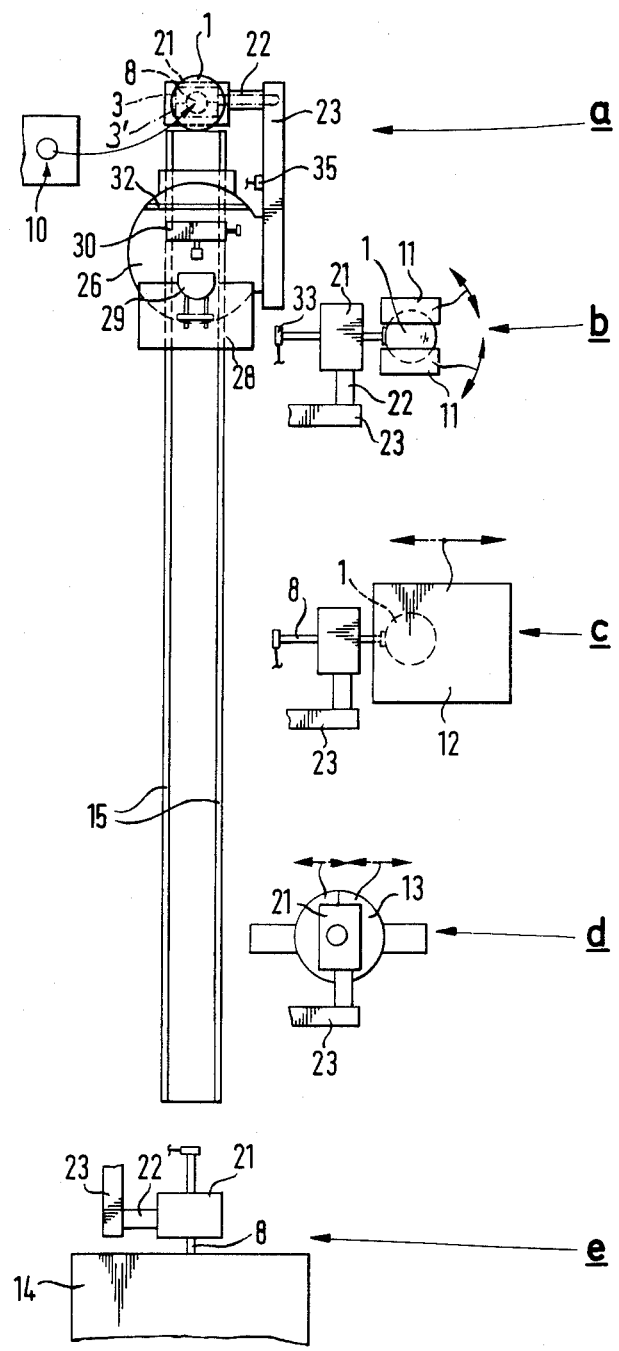
FIG. 3 is a schematic representation of the work stations including the manipulator shown as viewed from the top.

FIG. 3 schematically illustrates the process stages. The lump 1 is transported from the suction station 10 in the direction of the arrow to the blowing iron 8 which is in a vertical position with the head uppermost, and is bonded thereto as described above. After the joint has been made, the two-part vacuum mold 2 and 2' is opened, one lump-supporting two-part marver consisting of halves 3 and 3' (FIG. 2 and FIG. 4), is brought to the lump, the blowing iron 8 is swung out and at the same time set in rotation. The manipulator 46 is moved from the lump transfer station a to the marver b. There the one- or two-part marver 11 is brought to the lump 1, and the lump is molded and cooled down further. The supporting marver 3 and 3' is at this stage taken away from the lump and opened. After marving at b, the lump is taken to the heating station c by the manipulator 46 as soon as the manipulator 46 has arrived at the new position, a previously retracted heating oven 12 is driven forward in such a way that the lump is received in the firing chamber. The distance travelled by the heating oven can be controlled whereby differential depths of lump penetration into the firing chamber of the oven can be achieved to suit given requirements. Inside the oven, the lump is heated. At the end of the heating stage, the oven 12 is retracted and the manipulator 46, running along the track 15, is moved by the manipulator 46 to the form-giving station d̲. Depending on requirements the marving and heating stages may be done once or several times. The lump, which is already pre-blown during marving and heating, is further blown, swung down to the vertical and introduced into the open die 13. With narrow-necked objects, the neck constriction will be formed by means of a suitable device, not shown, prior to introducing the lump into the die. The die is then closed and final blowing applied in known manner. After the final blowing process the now finished object is moved by the manipulator 46 into the cooling lehr 14 (station e̲) and severed from the blowing iron. The object may also be severed from the blowing iron before entering the cooling lehr and would then be transported into the latter by separate, known means. The blowing iron is taken out of its holder after each blowing operation and replaced by another which has cooled down and been largely cleaned of glass.

The above described process stages and work sequence are no more than by way of example. It is also possible to apply any or all of the intermediate processing stages usual in glass-blowing and the work stations need not be arranged in a straight line but could be, for example on a circular arc.

Figure 4:
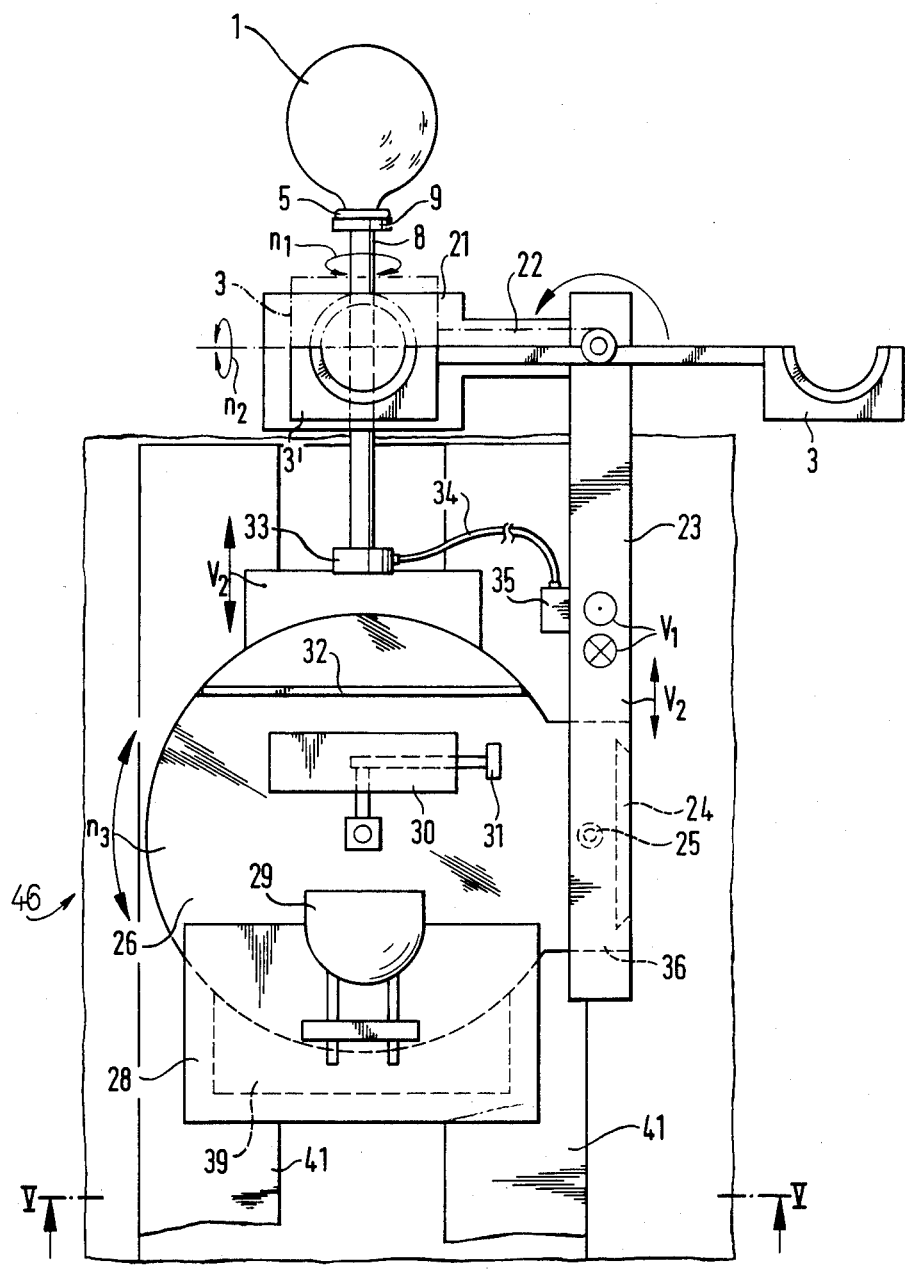
FIG. 4 is a top view of the manipulator according to the invention.

FIGS. 4 and 5 show the construction of the manipulator 46. The blowing iron 8 is gripped in the detachable holder 21 in which blowing iron drive elements are provided so that the iron 8 may be rotated about its own axis at a speed of $n_1 = 12$ to 120 r.p.m.

For lifting the iron together with the glass lump, the holder 21 is secured to an arm 22 extending normal to the blowing iron axis and adapted to be rotated at a speed $n_2 = 3$ to 30 r.p.m. and through an angle of 300°. The arm 22 and the two-part marver 3 and 3' are mounted on a supporting arm 23 so that the marver is above the arm 22 and the holder 21 and capable of supporting the erected glass lump.

The support arm 23 is connected via keyway 24 to the upright pillar 36 and, by means of cylinder 25, it is adjustable in the vertical direction at a speed $V_1 = 0$ to 0.6 m/s. The pillar 36 is mounted on a turntable 26 which is rotatable at $n_3 = 1.5$ to 15 l/m and carried, via central column 37 and rollers 38, on the undercarriage 39. The undercarriage 39 runs by means of rollers 40 on track rails 41 and is driven by an electric motor (not shown), by a pinion engaging the rack 42. A downwardly extending support 45 having at least one axle 44 with a wheel 43 prevent tilting of the manipulator in the different load positions. The conveying speed $V_2$ is adjustable from 0.01 to 0.6 m/s. With the exception of the driving motor for the undercarriage the manipulator is hydraulically driven. Hydraulics are housed in housing 28. This also accommodates the compressor for the glass-blowing air. Electrical energy is fed by means of sliding brush elements (not shown) in the track rail 41 and central column 37 into the interior of housing 28. For controlling the manipulator, the glassmaker sits on the stool 29 in front of the control console or desk 30. He controls, for example with his right hand, the rotary and swivel movements $n_1$ and $n_2$ of the blowing iron, using his left hand to control the pivotal movement $n_3$ of the turntable and the vertical lift $V_1$, and his right foot to control operating speed via foot-switch 31. The blowing air is controlled by the glassmaker into a moutpiece. Pressure is conducted through a hose to valve 35 and amplified. The blowing air is then fed via hose 34 and rotary feed 33 to the blowing iron 8. A transplant screen 32 protects the glassmaker from heat radiation.

With an apparatus of this kind, glass lumps of a weight greater than 100 kg can be readily processed without problems. Steering control and force amplification are provided by known means. These may be electrical, hydraulic, pneumatic or mechanical means.

I claim as my invention:
1. A method for processing molten glass lumps using an operator-controlled manipulator having a holder comprising the steps of:
   moving said glass lump from a first position to a preliminary blowing station engageable with said holder and preliminarily blowing said lump on said holder with said manipulator;
   moving the holder with the preliminarily blown glass lump thereon by said manipulator to a marving station and marving said glass lump;
   moving the holder with the marved glass lump thereon by said manipulator to a heating station and heating said glass lump;
   moving the holder with the heated glass lump thereon by said manipulator to a forming station and forming said glass lump;
   moving the holder with the formed glass lump thereon by said manipulator to a cooling lehr; and severing the cooled glass lump from said holder.
2. A method as claimed in claim 1 further defined by moving said manipulator along a track to selected locations on said track adjacent said marving station, said heating station, said forming station and said lehr.
3. A method as claimed in claim 1 wherein the step of preliminarily blowing said glass lump with said manipulator is further defined by said operator blowing into a mouthpiece and amplifying the pressure received from the operator to preliminarily blow said glass lump.

* * * * *